United States Patent
Suetti (10) Patent No.: US 11,662,285 B2
(45) Date of Patent: May 30, 2023

(54) DEVICE AND METHOD FOR ASCERTAINING MECHANICAL PROPERTIES OF A TEST BODY

(71) Applicant: TMD Friction Services GmbH, Leverkusen (DE)

(72) Inventor: Andre Garcia Lima Suetti, Monte Mor-SP (BR)

(73) Assignee: TMD Friction Services GmbH, Leverkusen (DE)

( * ) Notice: Subject to any disclaimer, the term of this patent is extended or adjusted under 35 U.S.C. 154(b) by 233 days.

(21) Appl. No.: 17/283,311

(22) PCT Filed: Dec. 21, 2018

(86) PCT No.: PCT/EP2018/086516
§ 371 (c)(1),
(2) Date: Apr. 7, 2021

(87) PCT Pub. No.: WO2020/126026
PCT Pub. Date: Jun. 25, 2020

(65) Prior Publication Data
US 2022/0003648 A1    Jan. 6, 2022

(51) Int. Cl.
*G01N 3/317* (2006.01)

(52) U.S. Cl.
CPC ....... *G01N 3/317* (2013.01); *G01N 2203/001* (2013.01); *G01N 2203/026* (2013.01); *G01N 2203/0212* (2013.01)

(58) Field of Classification Search
CPC ............ G01N 3/317; G01N 2203/001; G01N 2203/0212; G01N 2203/026
See application file for complete search history.

(56) References Cited

U.S. PATENT DOCUMENTS

| | | | | |
|---|---|---|---|---|
| 3,850,031 | A | * 11/1974 | Schwenzfeier | ...... G01N 29/225 73/159 |
| 4,860,572 | A | 8/1989 | Brar | |
| 2008/0141763 | A1 | * 6/2008 | Antonescu | ............... G01N 3/44 73/81 |
| 2016/0349171 | A1 | * 12/2016 | Hull | ........................ G01N 19/04 |
| 2017/0131184 | A1 | 5/2017 | Bellander | |
| 2020/0205730 | A1 | * 7/2020 | Nakashima | .......... A61B 5/0051 |

FOREIGN PATENT DOCUMENTS

| | | |
|---|---|---|
| CA | 2360086 A1 | 8/2000 |
| DE | 248438 C | 2/1911 |
| DE | 19903757 A1 | 8/2000 |
| DE | 102014116034 A1 | 5/2015 |

(Continued)

*Primary Examiner* — Natalie Huls
(74) *Attorney, Agent, or Firm* — Rogowski Law LLC (57) ABSTRACT

The invention relates to a device for ascertaining mechanical properties, for example, the natural frequency, the damping or the natural vibration mode of a test specimen containing ferromagnetic material components, in particular a brake pad for a motor vehicle. An electromagnetic actuator, in particular an electromagnet, is provided for exerting a magnetic attractive force onto the test specimen so that the actuator exerts a force impulse that imparts the test specimen with vibrations whose spectrum of vibration contains at least one natural frequency vibration of the test specimen.

17 Claims, 3 Drawing Sheets

(56) References Cited

FOREIGN PATENT DOCUMENTS

| | | | |
|---|---|---|---|
| DE | 102016227761 A1 | | 5/2017 |
| EP | 0412513 A2 | | 2/1991 |
| EP | 0440317 B1 | * | 3/1994 |
| JP | 2006527627 A | * | 12/2006 |
| WO | 9801737 A1 | | 1/1998 |

* cited by examiner

DEVICE AND METHOD FOR ASCERTAINING MECHANICAL PROPERTIES OF A TEST BODY

CROSS-REFERENCE TO RELATED APPLICATIONS

This application is a national stage application (under 35 USC § 371) of PCT/EP2018/086516, filed Dec. 21, 2018, the contents of which is incorporated by reference herein.

BACKGROUND OF THE INVENTION

Technical Field and State of the Art

The invention relates to a device and to a method for ascertaining mechanical properties, for example, the natural frequency of a test specimen or test body, especially of a brake pad for motor vehicles.

Mechanical properties such as, for instance, the natural frequency or the modal damping of a component are employed, for example, within the scope of quality control during the production of components, especially in the automotive sector.

Components such as, for instance, a brake pad for a motor vehicle or other parts used in automotive development, can exhibit defects at the time of production which, during operation, cause undesired vibrations, overload and, as a result thereof, undesired noise generation or additional energy consumption. Such vibrations can be caused by changed physical properties or geometrical properties, by unbalance in rotating parts, by uneven friction, weight, moisture or stress of the components.

In the automobile brake industry, compressibility is one of the quality parameters of brake pads. The test for measuring this parameter, however, is often very expensive and complicated since it is very difficult to implement in a large production line that makes use of compression analysis based on random sampling.

Generally speaking, the vibration behavior of an excited test specimen is ascertained on the basis of the occurrence of natural vibrations at its natural frequencies. The natural vibrations can have different modes. The natural frequencies are characteristic values of a system or component, in other words, they are frequencies that are characteristic for this component. Each of these natural frequencies has an associated normal mode, which is the specific deformation that the component to be analyzed would display during vibration at this frequency. The natural frequency and the normal mode of a component provide information as to how a body or a system behaves under dynamic load. A modal analysis can be used to study and quantify the occurring vibration behavior of the test specimen by ascertaining the natural frequencies and normal modes. The results of the modal analysis, that is to say, the characteristic values, the natural frequencies and the normal modes, are important parameters for the design of a structure in terms of dynamic loads. One or more measured transfer functions constitute the foundations of the modal model.

In modal analysis, a force is applied at a point of the test specimen to be examined, then the response signal or reaction of the test specimen is measured at another point, and the transfer function is calculated on this basis. The so-called mode shapes, that is to say, the vibration modes, are ascertained by determining the transfer function at a plurality of points of the test specimen. This information can be used to determine the vibration behavior of the test specimen. The decisive factors for the number and distribution of the natural frequencies of the test specimen are the geometry and the physical properties of the material, that is to say, the weight and the stiffness or the damping.

In order to determine the modal parameters, the test specimen to be examined is normally excited by a suitable source of excitation, for example, an impact hammer or an electrodynamic or hydraulic shaker, that generates a force impulse. The exciting force can be measured with a piezoelectric load cell. At the same time, the responses from the structure are detected, for instance, by means of acceleration pick-ups, measuring microphones or else laser vibrometers. The frequency responses or the transfer function between the excitation and the response are calculated by means of a fast Fourier transform (FFT/FRF).

In the impact hammer method, the test specimen is excited by means of a momentum, preferably using a modal hammer or impact hammer in order to determine the transfer function. An impact hammer is a hammer that is configured to excite the test specimen by applying a momentum. The impact hammer can be fitted with a force sensor.

The transfer of this momentum into the test specimen can be examined by means of additional sensors placed on the test specimen. Such examinations allow conclusions to be drawn, for instance, about the structural or acoustic properties of the object. This method can ascertain material flaws inside a given test specimen, for example, a construction material or some other material, and it can assess the extent of these flaws. Impact hammers are used in acoustic measuring technology for purposes of exciting structure-borne sound.

In order to determine the transfer behavior of certain test specimens, the impact hammer excites the test specimen with a force progression that is usually known from the force sensor. Structure-borne sound pick-ups can determine the vibration of the test specimen and microphones can detect the emitted airborne sound. The transfer behavior of the test specimen can be calculated on the basis of these measured signals.

An ideal force impulse is almost infinitely short in terms of time and it has an infinite amplitude, thus yielding a constant spectral power density over all frequencies.

The test specimen should be positioned in such a way that it can vibrate freely in order to obtain optimal results. Generally speaking, it is suspended elastically or else placed on a foam pad.

In order to avoid disturbing noises, for example, in a motor vehicle, complex methods are employed, for instance, for motor vehicle friction brakes that, during operation, are known to have a tendency to generate irregular noises that people perceive as being unpleasant. If the frequency of the occurring vibrations falls within the range of the natural frequencies of large-sized brake components or of the entire brake system, these components or system are excited and imparted with vibrations having extensive displacement amplitudes of the type that occur with resonance vibrations in the case of a relatively small amount of damping. The pressure waves resulting from this in the ambient atmosphere are perceived by human hearing as disturbing noises. As a countermeasure, the physical properties as well as the geometry of the brake pad and its design are adapted in such a way as to suppress the occurrence of undesired vibrations to the greatest extent possible. However, this is also difficult to achieve and even if so, only to an inadequate degree.

German patent application DE 199 03 757 A1, proposes, for instance, for the vibration energy that is introduced into a brake or clutch component—in the case of at least one friction-induced excitation frequency of the friction brake or friction clutch—to be converted by exciting at least one resonator which is connected to the component and whose first natural frequency is set to the value of the excitation frequency and whose surface is not sufficient to transfer noises via the air. For this reason, one of the components is connected to at least one resonator whose first natural frequency is set to a friction-induced excitation frequency of the brake or clutch system and whose surface is not sufficient to transfer noises via the air.

Vibration sensors are normally employed so that vibrations of a component can already be detected before it is installed, for example, in a motor vehicle. In order to analyze a test specimen, it is normally removed from an industrial production line and only then does it undergo an analysis. Consequently, due to the complexity of the measuring method, all that is carried out is a random inspection of individual components.

German patent application DE 248 438 A1, for example, discloses a method for non-destructively testing disk-shaped objects. A workpiece to be tested is made to vibrate by means of a strike against its surface. A vibration pick-up is used to detect the mechanical vibrations of the workpiece and to convert them into electric vibration signals. These electric vibration signals are fed to a precision impulse sound level meter. Following repeated amplification and filtering, a frequency-weighted alternating-voltage signal as well as a direct-voltage effective value are generated which are fed to an evaluation circuit where they are electronically evaluated. The workpiece to be tested is mounted in a manner that is free of damping and stress on the vibration nodal points that arise from the vibration excitation. The vibration exciter can be configured as a pendulum body with an embedded hardened steel ball that then strikes against the surface of the workpiece, thereby imparting the body with freely subsiding vibrations and simultaneously generating a sound.

German patent application DE 10 2016 221 761 A1 discloses a method and a device for handling dynamic properties of a vibrating machine component. An analysis apparatus monitors the vibration of the machine component in real time. If the dynamic properties of the machine component are below or near a threshold value, the analysis apparatus then provides a real-time indication that the vibration of the machine component is near the threshold value. The analysis apparatus receives the dynamic properties of the machine component on the basis of vibration data that is below and near a threshold value. A change in the dynamic properties influences how near the vibration is to this threshold value.

European patent specification EP 0 906 560 B1 discloses a method and a device to non-destructively determine the stiffness, strength and/or structural properties of a test object. For this purpose, the test object is placed into a test apparatus having a swiveling arm and a striker. The striker causes the test object to vibrate freely with at least one natural resonant vibration, so that the mechanical properties of the test object can be determined by ascertaining the vibrations.

Finally, German patent application DE 10 2014 116 034 A1 discloses a device and a method for ascertaining mechanical properties of a flexible test object, said device comprising a first holding element with which the test object can be detachably and firmly held in a first position as well as a second holding element with which the test object can be detachably and firmly held on a side that is opposite to the first side. The first holding element is connected to a first actuator by means of which mechanical excitations can be introduced into the test object. Moreover, the device comprises a control unit that serves to control the actuator as well as an optical sensor system to perform a 3D-scan of the surface of the test object while in its secured state. The mechanical properties of the test object are determined by means of a modal analysis employing a first and a second evaluation unit.

One prerequisite for carrying out a modal analysis and for subsequently deriving the natural frequencies of individual test specimens is that the test specimen has to be in the so-called "freely vibrating state" during the measurement. This means that the test object is dynamically isolated from the physical environment and any contact of the test object with other surfaces is eliminated. In the ideal case, the test object has to be in a so-called "floating state". Prior-art methods for determining the natural frequencies, however, involve suspending the test object using flexible wires or filaments, or else placing the test object on usually soft foam mats, so that this "floating state" is not attained.

A drawback of the methods and devices known from the state of the art is that, owing to the complexity of the measuring method, it is not possible to test all of the components, for instance, on a production line. All that takes place is an analysis of individual test objects which, for example, have to be removed from a production line in order to be tested. For this reason, this test method is very complex and only yields random sampling results.

Another drawback of the methods and devices known from the state of the art is that the measuring instruments employed there have moving parts which are especially failure-prone. In particular, prior-art impact actuators make use of a magnet system with moving pistons.

SUMMARY OF THE INVENTION

Before the backdrop of the disadvantages described above, the invention is based on a nonlimiting objective of putting forward a device and a method for ascertaining mechanical properties, for instance, the natural frequency or the natural vibration mode of a test specimen containing ferromagnetic material components, so as to allow a reliable and fast determination of the mechanical properties of the test specimen.

The invention relates to a device for ascertaining mechanical properties, for instance, the natural frequency, the modal damping or the natural vibration mode of a test specimen containing ferromagnetic material components, especially a brake pad for a motor vehicle.

According to the invention, an electromagnetic actuator, especially an electromagnet, is provided for exerting a magnetic force of attraction onto the test specimen so that the actuator exerts a force impulse that imparts the test specimen with vibrations whose spectrum contains at least one natural frequency vibration of the test specimen.

The electromechanical actuator exerts a magnetic force of attraction onto the test specimen so that the latter is attracted in the direction of the electromagnetic actuator if the magnetic force of attraction has been properly dimensioned. This magnetic force of attraction is configured in such a way that the test specimen strikes the actuator so that the force impulse is exerted onto the test specimen, as a result of which the mechanical excitations are introduced into the test specimen.

The duration of the magnetic force of attraction is configured in such a way that the test specimen, which is normally lying on a work bench or moving on a conveyor belt of an industrial production line, is attracted upwards to the actuator situated above said test specimen, so that the force impulse can be applied.

For this reason, at the moment of the force impulse, the test specimen is in a so-called "floating state", that is to say, it is dynamic relative to the physical environment. Consequently, there is no need for the test specimen to be suspended or else damped by means of foam mats or the like, as is known from the state of the art. This is why the device can be installed in industrial processes comprising production lines, work benches, etc. so that the prerequisites of a free vibrating state are met.

Since, in contrast to the prior-art impact actuators fitted with moving pistons, the device does not have any moving parts, the service life of the device is altogether longer and moreover, it has a simple construction.

Thanks to the invention, it is also possible to carry out a natural frequency test that is based on a modal analysis test and that can be implemented quickly and cost-effectively, and especially advantageously, in one hundred percent of the components during large-scale production, particularly in the production of brake pads. For this reason, the present invention makes an essential contribution to the automation and standardization of the modal test of ferromagnetic test specimens. After all, the natural frequency or the damping of the test specimens can be employed in one hundred percent of the manufactured components instead of merely in individual samples.

As mentioned, an electromagnet can be provided for attracting the test specimen. The use of an electromagnet to excite the natural frequencies in the test specimen is advantageous since its magnetic force of attraction as well as its duration can be set in such a way that, even though the test specimen is attracted against the actuation head, it is prevented from adhering to the electromagnet and an excitation within the frequency range of up to approximately 10 kHz is possible.

Moreover, the control of the electromagnet prevents the test specimen from striking the actuation head multiple times.

The duration of the impact of the test specimen against the actuation head is relatively short and is within the hundredth of a second or millisecond range.

According to a first advantageous embodiment of the invention, the actuator is arranged so as to be suspended opposite from the test specimen in the initial state, especially by means of a holding device. The term initial state means that no magnetic force of attraction of the actuator is acting upon the test specimen, so that it can lie undisturbed on a substrate. The holding device having the actuator can be used particularly easily in an existing production line for quality assurance purposes in that the device is arranged on a transport mechanism, especially a conveyor belt, in such a way that, during operation, the actuator, which is arranged so as to be suspended above the test specimens, especially on the holding device, allows a measurement of all of the test specimens that pass by the actuator.

Since the actuator is arranged so as to be suspended, free vibrating conditions exist for the test specimen when the test specimen comes into contact with the actuator at the time of the force impulse. After all, the test specimen is brought into the floating state by the magnetic force of attraction at the point in time of the force impulse, so that there is no need for any holding means such as elastic cables or foam pads.

According to an advantageous variant of the invention, the actuator is held on the holding device by means of at least one damping element. This damping element can be configured as a washer in order to damp the vibrations generated in the device, so that a high level of stability is ensured for the device during operation.

In another advantageous embodiment of the invention, a transport mechanism is provided for transporting several test specimens arranged one after the other through the device. The actuator exerts the magnetic force of attraction onto the test specimen cyclically. As mentioned, the holding device can be integrated into an industrial production line. Normally, during the production of the components in an industrial production line, they are transported, for example, arranged one after the other on a conveyor belt, especially in order to be transported from one manufacturing step to the next. At the end of the manufacturing process or else for purposes of an interim analysis of the components, the device according to the invention can be employed in this production line in order to ensure that all of the components transported there are analyzed.

When a component passes by the device, the actuator is activated so that the magnetic force of attraction is exerted onto the component, attracting it towards the actuator in order to introduce the force impulse. As a rule, during this time, the other components continue to be moved by means of the transport mechanism. After the analysis of the test specimen, the actuator is de-energized, so that the test specimen drops back onto the transport mechanism and is conveyed further.

Owing to the cyclical application of the magnetic force of attraction onto the test specimens, they can be continuously conveyed further by the transport mechanism. A prerequisite for this is that the distance between adjacent test specimens has to be selected in such a way that all of the test specimens can be analyzed and the individual test specimens do not collide with each other if the next test specimen is already passing the device while an analysis of a test specimen is still ongoing.

In order to avoid measuring errors and malfunctions during the analysis, the transport mechanism can be made of a non-ferromagnetic material. This especially prevents parts of the transport mechanism, for example, the conveyor belt, from themselves being attracted or lifted due to the action of the magnetic force of attraction.

According to another advantageous embodiment of the invention, the actuator has an actuation head for introducing the force impulse into the test specimen. The movement, the shape, the weight and stiffness of the actuation head are specified in such a way that a suitable physical impact on the test specimen in terms of the frequency and energy content is achieved. The actuation head can especially have a projecting section so as to allow a virtually punctiform introduction of the force impulse, so that the impacted test specimen exhibits a clearly detectable vibration spectrum.

Due to its impact momentum, the actuation head yields a flat, continuous spectrum. This spectrum can be adapted to the relevant frequency range by using appropriate actuation heads. The actuation head can be configured so as to be essentially dome-shaped or pyramid-shaped. The duration or mode of the excitation spectrum results from the weight and stiffness of the actuation head as well as from its structure. In the case of a hard structure that is excited by a relatively small actuation head, it is primarily the stiffness of the actuation head that influences the spectrum. The use of actuation heads made of various materials makes it possible to adapt the exciter spectrum to the frequency range that is to be examined.

The actuation head can essentially be made, for example, of steel or plastic or rubber. On the one hand, this ensures that the quality of the force impulse onto the test specimen is sufficient and, at the same time, also ensures good durability of the actuation head.

According to another embodiment of the invention, a sensor unit, especially a microphone or a laser vibrometer, is provided for optically and/or acoustically detecting the natural frequency vibrations of the excited test specimen.

A laser vibrometer is a measuring instrument that serves to quantify mechanical vibrations. It can be used to measure the vibration frequency and the vibration amplitude. Laser light is focused onto the surface that is to be examined. Owing to the Doppler effect, the frequency of the backscattered laser light shifts when the surface to be tested moves, for instance, when the test specimen vibrates. This frequency shift is evaluated in the vibrometer employing an interferometer and then output as voltage signals or as a digital data stream. Such vibrometers are used, for example, in the automotive realm in order to measure the vibration modes of individual components or even of entire vehicles.

A trigger of this sensor unit can be synchronized with the start of the force impulse. For this reason, according to another advantageous variant, the device can have a control unit for controlling the actuator and/or for synchronizing the sensor unit with the introduction of the force impulse into the test specimen.

According to another advantageous embodiment of the invention, the sensor unit has a force sensor to measure a force function. The actuator according to the invention is not provided only for detecting natural frequencies of the test specimen. It can also be provided for a force sensor that is connected in series to the actuator to be used to detect the force function during the force impulse. The force sensor can be arranged on the striking side of the actuation head. The measurement of the force signal provides information about the force and the spectrum of the force impulse. The signal from the microphone or laser vibrometer can be mathematically reconciled with the signal of the force sensor, for instance, in order to correct for uneven excitations.

In a refinement of the invention, an evaluation means is provided for comparing, calculating and/or checking data that has preferably been measured by means of the sensor unit and/or stored. The data can be stored for quality assurance purposes as well as for assessing the manufacturing process.

An online measurement carries out an evaluation of each component to check whether this component is flawless or whether it has a defect. Defective components can be removed from the further production process by means of an ejection apparatus.

According to an independent idea of the invention, a method is being put forward for ascertaining mechanical properties, for instance, the natural frequency, the damping or the natural vibration mode of a test specimen containing ferromagnetic material components, especially a brake pad for a motor vehicle, employing a device as described above, whereby a magnetic force of attraction is exerted onto the test specimen in order to introduce a force impulse into the test specimen so as impart it with vibrations whose spectrum contains at least one natural frequency vibration of the test specimen.

Due to the magnetic force of attraction, the test specimen is moved towards the actuator, especially towards an actuation head of the actuator, thereby coming into contact with it, so that the impact on the test specimen takes place through a force impulse of the test specimen against the actuation head.

In a first advantageous embodiment of the method according to the invention, essentially free vibration conditions are present in the test specimen at the point in time of the effect of the actuation head.

According to another advantageous embodiment of the invention, natural frequencies that belong to a natural vibration of the test specimen are measured and the measured natural frequencies are compared to reference values.

In another variant of the invention, a comparison of the measured values to the reference values checks whether they match, which is then used as a basis for determining the values for the compressibility of the test specimen.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

In this context, the following is shown, at times schematically:

FIG. 1 the device for ascertaining mechanical properties of a test specimen in a first position a) in a side sectional view and b) in a sectional view from the top, FIG. 2 the device as shown in FIG. 1a) in a second position, and FIG. 3 a schematic circuit diagram of the device as shown in FIG. 1.

DETAILED DESCRIPTION

For the sake of clarity, identical components or those having the same effect are provided with the same reference numerals in the figures of the drawing shown below.

Figure 1:
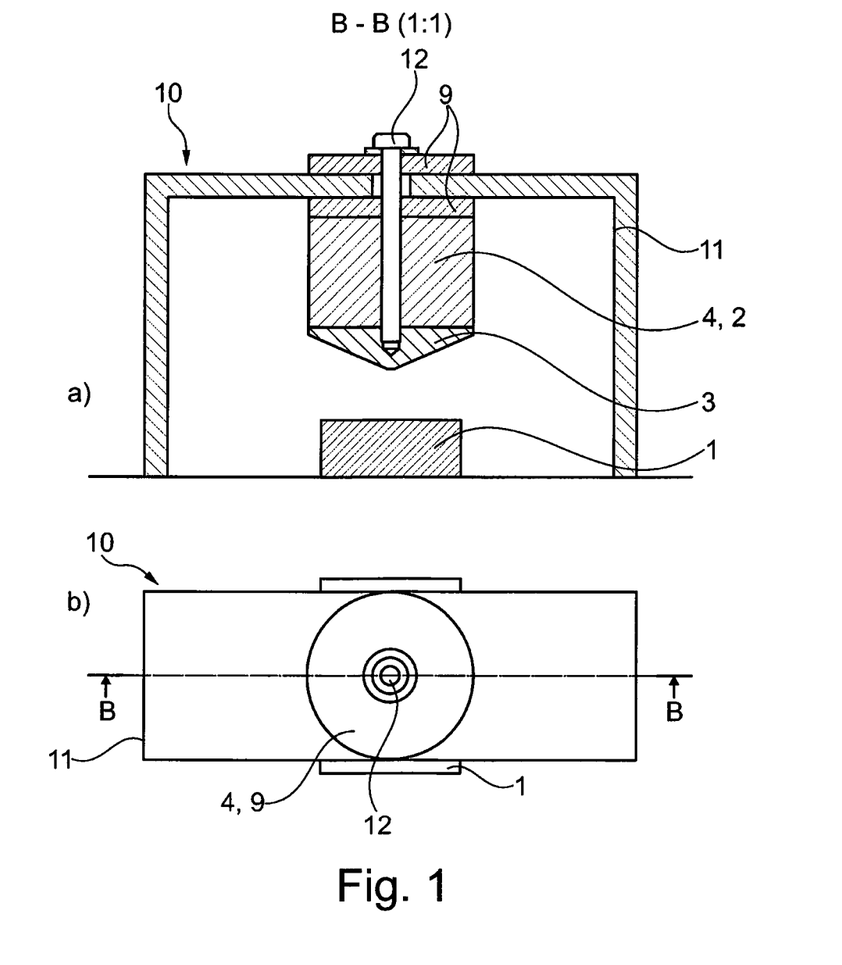

FIG. 1 shows a device 10 for ascertaining mechanical properties, for instance, the natural frequency, the damping or the natural vibration mode, of a test specimen 1 containing ferromagnetic material components, especially a brake pad for a motor vehicle. An electromagnetic actuator 2, especially an electromagnet 4, is provided for exerting a magnetic force of attraction onto the test specimen 1.

This magnetic force of attraction is dimensioned in such a way that the test specimen 1 is attracted in the direction of the actuator 2, so that, due to the magnetic force of attraction, the actuator 2 exerts a force impulse onto the test specimen 1. The force impulse imparts the test specimen 1 with vibrations whose spectrum contains at least one natural frequency vibration of the test specimen 1.

Figure 2:
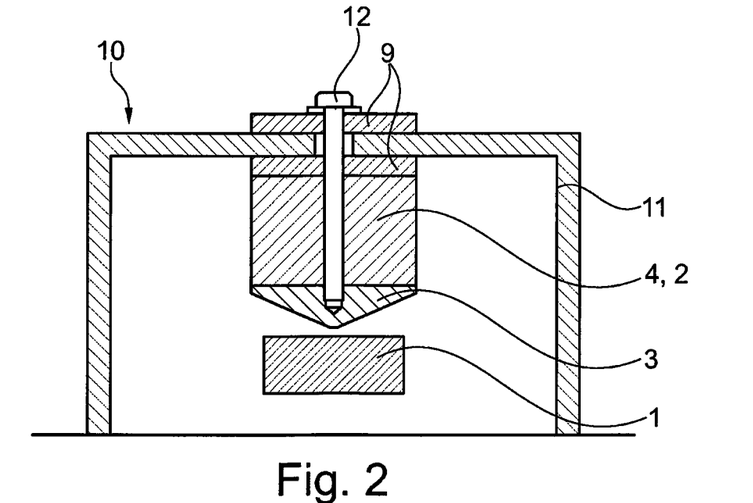

As can be seen in FIGS. 1 and 2, the actuator 2 is arranged so as to be suspended opposite from the test specimen 1 by means of a holding means 11. In the present embodiment, the actuator 2 is fastened with a screw 12 to the holding means 11, so that the actuator 2, in its operating position, is suspended above the components or test specimens 1 that are to be checked.

The actuator 2 is also held on the holding device 11 by means of two damping elements 9. These damping elements 9 can be configured as washers in order to damp the vibrations generated by the force impulse inside the device 10, so that a high level of stability is ensured for the device 10 during operation.

The actuator 2 has an actuation head 3 that serves to introduce the force impulse into the test specimen 1. Due to its impact momentum, this actuation head 3 produces a flat, continuous spectrum. The actuation head 3 can be configured so as to be essentially dome-shaped or pyramid-shaped. The duration or mode of the excitation spectrum results from the weight and stiffness of the actuation head 3 as well as from its structure.

The use of actuation heads 3 made of various materials makes it possible to adapt the exciter spectrum to the frequency range that is to be examined.

The actuation head 3 can essentially be made, for example, of steel or plastic or rubber.

The holding device 11 having the actuator 2 can be used in an existing industrial production line for purposes of the quality assurance of components in that the device is arranged, for example, on a transport mechanism, especially a conveyor belt.

At the point in time of the activation of the actuator 2, the magnetic force of attraction acts upon the test specimen 1, attracting it in the direction of the suspended actuator 2, in other words, upwards, as shown in FIG. 2. If the magnetic force of attraction has been properly dimensioned, the test specimen 1 strikes the actuation head 3 of the actuator 2 so that the force impulse is exerted onto the test specimen 1, and mechanical excitations are introduced into the test specimen 1. The duration of the impact of the test specimen 1 against the actuation head 3 is relatively short and falls within the hundredth of a second or millisecond range.

Since the actuator 2 is arranged so as to be suspended, free vibrating conditions exist for the test specimen 1 when the test specimen 1 comes into contact with the actuator 2. After all, the test specimen 1 is brought into a so-called floating state at the point in time of the force impulse. In this floating state, the test specimen 1 is dynamically isolated from the physical environment and is not in contact with any other surfaces. For this reason, there is no need for a suspension or for elastic placement of the test specimen 1 by means of foam pads or the like.

The use of an electromagnet 4 to excite the natural frequencies in the test specimen 1 is advantageous since the magnitude of the magnetic force of attraction as well as the duration of the activation can be set in such a way that, although the test specimen 1 is attracted towards the actuation head 3, it is prevented from adhering to the electromagnet 4. Moreover, the control of the electromagnet 4 prevents the test specimen 1 from striking the actuation head 3 multiple times.

When it comes to industrial production processes, the device 10 can be integrated very easily and effectively even into existing production lines. Normally, such production lines have a transport mechanism to transport several components arranged one after the other.

By means of the actuator 2 of a device 10 that has been integrated in this manner, the magnetic force of attraction needed for a force impulse is exerted onto the test specimen 1 to be analyzed. During this time, the other test specimens 1 that are still present on the transport mechanism are moved along by means of the transport mechanism. After the force impulse onto the test specimen 1 has been executed, the actuator 2 is de-energized, so that the test specimen 1 drops back onto the transport mechanism and is conveyed further before the next test specimen is magnetically attracted.

Owing to the cyclical application of the magnetic force of attraction onto the test specimens 1, they can be continuously conveyed further by the transport mechanism. A prerequisite for this is that the distance between adjacent test specimens 1 has to be selected in such a way that the test specimens 1 do not collide with each other, for example, if the next test specimen 1 is already passing the device 10 while an analysis of a test specimen 1 is still ongoing.

In order to avoid measuring errors and malfunctions during the analysis, the transport mechanism can be made of a non-ferromagnetic material.

Figure 3:
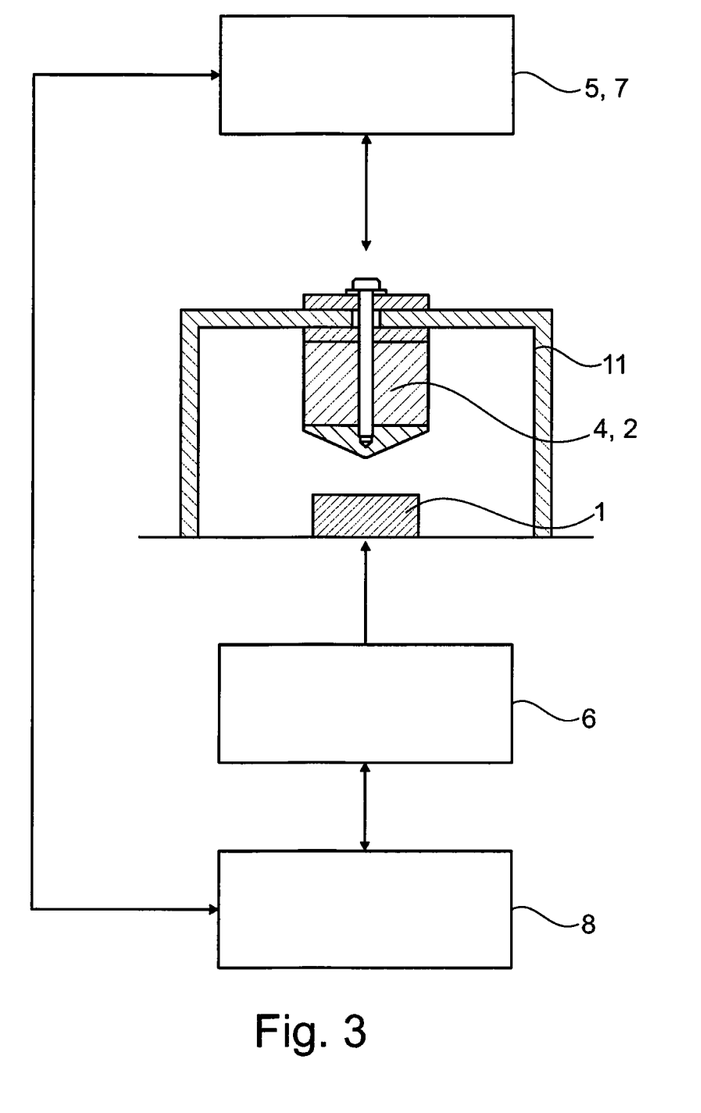

As the schematic view depicted in FIG. 3 shows, a sensor unit 5 serves to optically and/or acoustically detect the natural frequencies of the natural frequency vibrations of the excited test specimen 1. The measurement of the vibration of the test specimen 1 can be carried out by means of a sensor unit 5 such as, for instance, a vibration sensor, especially a microphone or a laser vibrometer. The trigger of this sensor 5 can be synchronized with the start of the force impulse. For this reason, the device 10 can have a control unit 6 for controlling the actuator 2 and/or for synchronizing the sensor unit 5 with the introduction of the force impulse into the test specimen 1.

In addition, the sensor unit 5 can have a force sensor 7 to measure a force function. This force sensor 7 can be connected in series to the actuator 2 in order to detect the force function during the force impulse. The measurement of the force signal provides information about the force and the spectrum of the force impulse. For example, the signal from the microphone or laser vibrometer can be mathematically reconciled with the signal of the force sensor 7 in order to correct for uneven excitations.

For purposes of evaluating the measured data, an evaluation unit 8 is provided in which the measured data is compared to reference data that, for example, had been previously stored, in order to ascertain whether an analyzed test specimen 1 exhibits a defect and conceivably needs to be segregated. Moreover, the measured data can be converted and/or checked in the evaluation unit 8.

If the test specimen 1 is a brake pad that has a brake pad carrier plate with a friction lining arranged on it, the test specimen is magnetically attracted with the brake pad carrier plate side towards the actuation head 3 of the actuator 2, so that the force impulse is introduced onto the carrier plate side of the brake pad. This causes the brake pad to vibrate. These vibrations are then analyzed, as already described above. On the basis of the natural frequencies of the brake pad measured in this manner, conclusions can be drawn about the compressibility of the brake pad and about the state of the brake pad. This measurement allows an evaluation of each component as to whether it is flawless or whether it has a defect. The defective components can be removed from the further production process by means of an ejection apparatus.

The measured or calculated data can be employed to monitor a manufacturing process, to segregate components that fall outside of a defined scatter band or else in order to detect flaws.

It is not necessary to remove individual pads in order to carry out a quality analysis since all of the pads are checked by the device for ascertaining mechanical properties.

Therefore, on the basis of the invention, it is possible to carry out a natural frequency test that can be implemented quickly and cost-effectively and especially advantageously in one hundred percent of the components during large-scale production, particularly brake pad production. For this reason, the present invention makes a major contribution to the automation and standardization of the modal test of ferromagnetic test specimens 1.

LIST OF REFERENCE NUMERALS 1 test specimen
2 electromagnetic actuator 3 actuation head
4 electromagnet
5 sensor unit
6 control unit
7 force sensor
8 evaluation unit
9 damping element
10 device
11 holding device
12 screw

The invention claimed is:

1. A device (10) for ascertaining mechanical properties of a test specimen (1) containing ferromagnetic material components, comprising:
an electromagnetic actuator (2) with an actuation head (3) configured to exert one or more force impulses of a magnetic force of attraction into the test specimen (1) so that the test specimen (1) comes into contact with the actuation head (the test specimen (1) vibrates, and a vibration spectrum of such vibrations contains at least one natural frequency vibration of the test specimen (1);
wherein the test specimen is configured as a brake pad for a motor vehicle.

2. The device (10) according to claim 1, further comprising a frame (11), wherein the electromagnetic actuator (2) is held in or on the frame (11) and suspended opposite from the test specimen (1) prior to activating the electromagnetic actuator (2).

3. The device (10) according to claim 2, wherein the electromagnetic actuator (2) is held on the frame (11) with at least one damping element (9).

4. The device (10) according to claim 1, further comprising a transport mechanism for transporting several test specimens (1) arranged one after the other through the device (10), and wherein the electromagnetic actuator (2) exerts the magnetic force of attraction onto the test specimen (1) cyclically.

5. The device (10) according to claim 4, wherein the transport mechanism is made of a non-ferromagnetic material.

6. The device (10) according to claim 1, further comprising a sensor unit (5) for optically and/or acoustically detecting the natural frequency vibrations of the test specimen (1) that is excited due to application of the one or more force impulses onto the test specimen (1).

7. The device (10) according to claim 6, wherein the sensor unit (5) has a force sensor (7) configured to measure a force-over-time function during application of the one or more force impulses.

8. The device (10) according to claim 6, wherein the sensor unit (5) is synchronized with the introduction of the one or more force impulses into or onto the test specimen (1).

9. The device (10) according to claim 6, wherein data that has been measured by the sensor unit (5) is compared to or checked with data that has been stored.

10. The device according to claim 1, wherein the actuation head (3) is dome-shaped or pyramid-shaped.

11. A method for ascertaining mechanical properties of a test specimen (1) containing ferromagnetic material components, comprising:
exerting a magnetic force of attraction onto the test specimen (1) with an electromagnet actuator (2) or electromagnet with an actuation head (3) configured to introduce a force impulse into the test specimen (1) so that the test specimen (1) comes into contact with the actuation head (3), and the test specimen (1) is imparted with vibrations whose spectrum contains at least one natural frequency vibration of the test specimen (1); and
optically and/or acoustically detecting the natural frequency vibration(s) of the test specimen (1) upon excitation of the test specimen (1) with the force impulse from the electromagnet actuator (2) or electromagnet;
wherein the test specimen (1) is configured as a brake pad for a motor vehicle.

12. The method according to claim 11, wherein the test specimen (1) is substantially free of vibration before the electromagnetic actuator (2) or electromagnet is actuated.

13. The method according to claim 11, wherein natural frequencies that belong to a natural vibration of the test specimen (1) are measured and the measured natural frequencies are compared to reference values.

14. The method according to claim 13, further comprising determining a compressibility parameter of the test specimen (1) by comparing the measured natural frequencies to reference values of natural frequencies for other test specimen with known compressibility parameters.

15. The method of claim 11, further comprising transporting several test specimens arranged one after the other to be vibrated by exerted magnetic force from the electromagnetic actuator or electromagnet, wherein the magnetic force of attraction is exerted onto the test specimens cyclically.

16. A device for determining mechanical properties of a brake pad for a motor vehicle, comprising:
an electromagnetic actuator or electromagnet to exert a magnetic force of attraction onto the brake pad by a force impulse to impart the brake pad with vibrations having a spectrum of frequencies that contains at least one natural frequency vibration of the brake pad;
a frame that includes at least one damping element to suspend the electromagnetic actuator or electromagnet in position spaced apart from the brake pad; and
a sensor unit to optically and/or acoustically detect the natural frequency vibrations of the brake pad while the brake pad is vibrated in response to the magnetic force impulses exerted thereon by the electromagnetic actuator or electromagnet.

17. The device of claim 16, wherein the sensor unit is a sensor selected from the group consisting of: a microphone and a laser vibrometer.

* * * * *